T. S. LANGFORD.
TUCKER ROLL FOR HAY PRESSES.
APPLICATION FILED APR. 24, 1915.
1,149,654.
Patented Aug. 10, 1915.
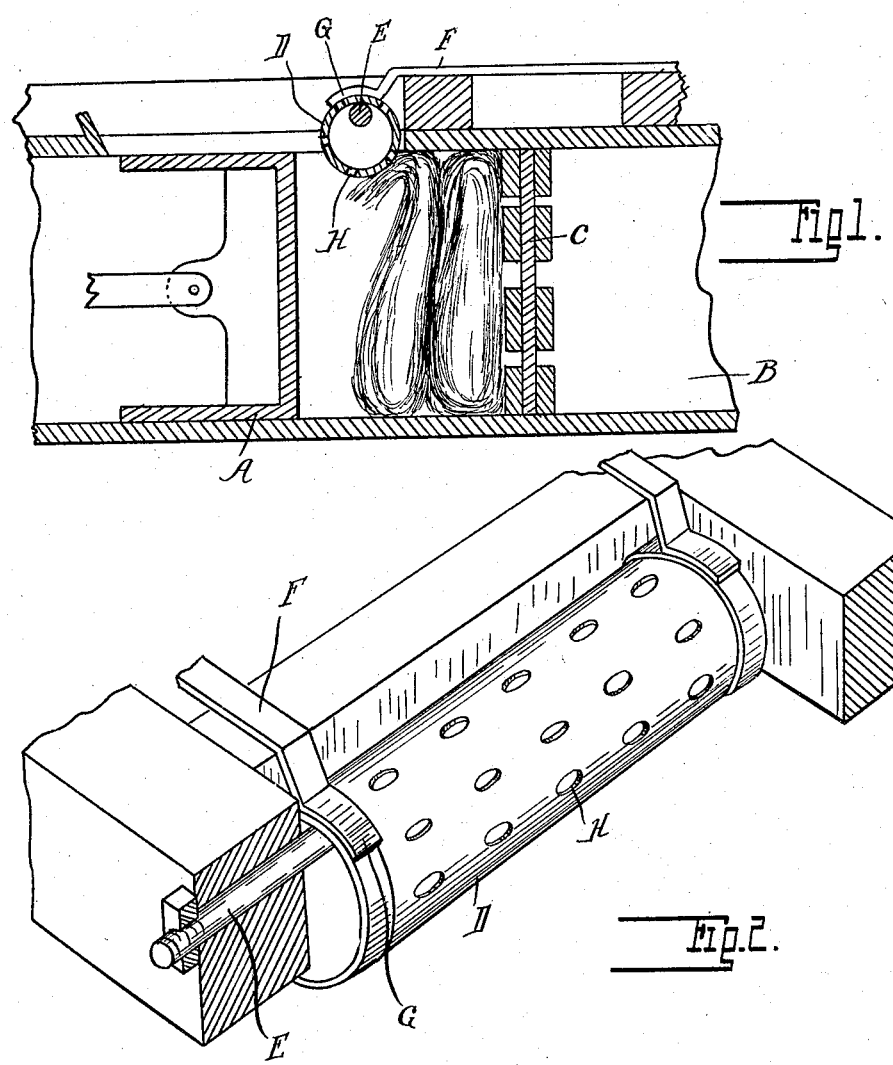
Inventor
Theron S. Langford
Witnesses
By Whittemore Hulbert + Whittemore
Attorneys

UNITED STATES PATENT OFFICE.

THERON S. LANGFORD, OF ANN ARBOR, MICHIGAN, ASSIGNOR TO THE ANN ARBOR MACHINE COMPANY, OF ANN ARBOR, MICHIGAN, A CORPORATION OF MICHIGAN.

TUCKER-ROLL FOR HAY-PRESSES.

1,149,654.    Specification of Letters Patent.    Patented Aug. 10, 1915.

Application filed April 24, 1915. Serial No. 23,552.

*To all whom it may concern:*

Be it known that I, THERON S. LANGFORD, a citizen of the United States of America, residing at Ann Arbor, in the county of Washtenaw and State of Michigan, have invented certain new and useful Improvements in Tucker-Rolls for Hay-Presses, of which the following is a specification, reference being had therein to the accompanying drawings.

The invention relates to hay-presses of that type in which the hay is pressed downward by a feeder into the path of a reciprocating plunger, which latter carries it into the box or mold in which it is compressed. On account of the resiliency of the material, there is a tendency for it to spring up upon the withdrawal of the feeder so as to be out of the path of the plunger; and there is also a tendency for the hay that is compressed in the box to spring outward upon the withdrawal of the plunger. To overcome these tendencies, yieldable tuckers have been provided, and one form which has heretofore been used is that of a hollow roll mounted upon a rod of lesser diameter and extending across the former at the mouth of the opening to the box. This roll is yieldably pressed downward by springs, and during the feeding and compression movements is free to roll, oscillate and yield vertically, so as to permit the forcing into the box of all of the hay and to prevent the withdrawal of the same.

The present invention relates to improvement in tuckers of the type just described, which is designed to overcome a serious defect in previous construction. This defect is the accumulation of dust, short lengths of hay, etc. in the hollow roll, and experience has demonstrated that this accumulation will frequently completely fill the space and interfere with the normal function. Thus the upward pressure on the roll when clogged will strain the supporting rod and frequently bend the same out of shape. I have overcome this difficulty by forming the hollow roll with an apertured wall, thereby permitting the material to drop out through the apertures and to prevent accumulation and clogging.

In the drawings: Figure 1 is a longitudinal section through a portion of the press to which my improvement is applied; Fig. 2 is a perspective view of the tucker roll.

A is the reciprocating plunger, which coöperates with a feeder (not shown), B is the box into which the hay is compressed, C are the followers which are placed intermediate bales, and D is the hollow roll which forms the tucker. This roll is supported upon a rod E which extends across the frame of the machine at the mouth of the box, being yieldably pressed downward by springs F at opposite ends thereof. These springs have segmental portions G bearing upon the roll, which tend not only to press the roll downward but to center it in the vertical plane of the rod E.

Instead of making the hollow roll D imperforate in its wall portion, as has been the practice heretofore, I provide this roll with a series of apertures H, or otherwise cutaway portions of the wall to form openings into the hollow space. These openings do not interfere with the normal function of the roll, and practical tests have shown that there will be no accumulation within the hollow space which will interfere with the freedom of movement of the roll upon the rod E. Whatever material does find access to the space within the roll is soon ground up so that it will drop out through the apertures H. Thus my improvement increases the life of the device and automatically clears itself from interfering material.

What I claim as my invention is:—

1. In a hay-press, a tucker comprising a supporting rod, and a hollow roll having an apertured wall loosely mounted on said rod.

2. In a hay-press, a tucker comprising a supporting rod extending across the frame of the machine and a hollow roll loosely sleeved upon said rod provided with a series of apertures in the wall thereof.

In testimony whereof I affix my signature in presence of two witnesses.

THERON S. LANGFORD.

Witnesses:
 KATHERINE A. STEEB,
 SIDNEY C. CASE.

Copies of this patent may be obtained for five cents each, by addressing the "Commissioner of Patents, Washington, D. C."